United States Patent
Olsen et al.

(10) Patent No.: US 11,101,833 B2
(45) Date of Patent: Aug. 24, 2021

(54) DEMODULATORS

(71) Applicant: Nordic Semiconductor ASA, Trondheim (NO)

(72) Inventors: Eivind Sjøgren Olsen, Trondheim (NO); Sverre Wichlund, Trondheim (NO); Ruben Undheim, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/466,623

(22) PCT Filed: Dec. 4, 2017

(86) PCT No.: PCT/GB2017/053649
§ 371 (c)(1),
(2) Date: Jun. 4, 2019

(87) PCT Pub. No.: WO2018/104715
PCT Pub. Date: Jun. 14, 2018

(65) Prior Publication Data
US 2019/0379415 A1    Dec. 12, 2019

(30) Foreign Application Priority Data

Dec. 5, 2016 (GB) .................................. 1620665.8

(51) Int. Cl.
*H04B 1/16* (2006.01)
*H04L 27/06* (2006.01)

(52) U.S. Cl.
CPC ............... *H04B 1/16* (2013.01); *H04L 27/06* (2013.01)

(58) Field of Classification Search
CPC ........... H04B 1/16; H04L 27/06; H04L 27/14; H04L 27/22; H04L 27/38
See application file for complete search history.

(56) References Cited

U.S. PATENT DOCUMENTS 6,381,289 B1   4/2002   Dutta
8,401,121 B1   3/2013   Ozgur
(Continued)

FOREIGN PATENT DOCUMENTS

WO   WO 99/39484 A2   8/1999
WO   WO 03/032593 A1   4/2003

OTHER PUBLICATIONS

International Search Report and Written Opinion for PCT/GB2017/053649, dated Mar. 22, 2018, 19 pages.
(Continued)

*Primary Examiner* — Kabir A Timory
(74) *Attorney, Agent, or Firm* — Klarquist Sparkman, LLP (57) ABSTRACT

A radio receiver device is arranged to receive a radio signal including a data packet having an address portion and a payload portion, said radio receiver comprising:
  a first demodulation circuit portion arranged to demodulate the data packet and produce a first estimate of the address portion and a first estimate of the payload portion;
  a second demodulation circuit portion arranged to demodulate the data packet and produce a second estimate of the payload portion;
  a first comparison circuit portion arranged to compare said first and second estimates of the payload portion and produce a flag only if they are identical; and
  a second comparison circuit portion arranged, upon receipt of said flag, to compare said first estimate of the address portion to an expected address portion and to discard the data packet if they are not identical.

17 Claims, 6 Drawing Sheets

(56) References Cited

U.S. PATENT DOCUMENTS

| | | | |
|---|---|---|---|
| 2006/0166634 A1* | 7/2006 | Ido | H04B 7/084 |
| | | | 455/277.1 |
| 2008/0084823 A1* | 4/2008 | Akasaka | G08C 17/00 |
| | | | 370/235 |
| 2013/0070828 A1 | 3/2013 | Das et al. | |
| 2014/0226706 A1* | 8/2014 | Jao | H04B 7/0882 |
| | | | 375/232 |

OTHER PUBLICATIONS

Search Report under Section 17(5) for GB1620665.8, dated Jul. 21, 2017, 4 pages.

* cited by examiner

DEMODULATORS

CROSS REFERENCE TO RELATED APPLICATIONS

This is the U.S. National Stage of International Application No. PCT/GB2017/053649, filed Dec. 4, 2017, which was published in English under PCT Article 21(2), which in turn claims the benefit of Great Britain Application No. 1620665.8, filed Dec. 5, 2016.

The present invention relates to demodulators for use in radio communication receivers, particularly to determining whether a received data packet was intended to be received by a given receiver or whether the reception of the data packet was erroneous and intended for a different receiver.

A radio signal modulated with a data packet typically comprises at least an address and a payload, wherein the address identifies the intended recipient of the data, and the payload contains any information that is meant to be conveyed by the data packet (e.g. audio data, video data, financial information, input and output signals to and from a control system, etc.). A radio transmitter will typically use any one of a number of modulation techniques known in the art per se to alter the properties of a carrier signal such as the amplitude (amplitude modulation), the frequency (frequency modulation), or the phase (phase modulation) in response to the "symbols" of the data packet. In the most basic example, a string of digital '0's and '1's may be used to modulate the carrier signal by changing one of these properties between two discrete values, such that a radio receiver can observe the received signal and demodulate it in order to recover the data packet (i.e. the '0's and '1's) that were used by the transmitter when generating the radio signal.

When demodulating received radio signals in order to extract a data packet modulated onto a carrier signal, it is important for high-performance demodulators to correlate the beginning of the packet—often a synchronisation word (or "sync word") or the address—with a known sequence in order to achieve an estimate of both the frequency offset (i.e. a difference in frequency between the ideal nominal modulation frequency and the actual modulation frequency of the received signal) and the symbol timing (i.e. where each data symbol starts and finishes within the data packet). Such correlation may provide either "hard-matching", wherein the correlator performs a symbol-wise comparison of the received signal and the known sequence in order to provide a definitive decision of whether or not the two match, or "soft-matching", wherein the correlator provides a "fuzzy" output that indicates how certain it is of a particular match without committing to a definitive decision.

If the sync word is also an address, which may take any value within an acceptable range usually determined by the radio protocol, and hard-matching of the address is desired, the Applicant has recognised that a soft output from the correlator is typically not good enough and often leads to false positives (i.e. reported matches that are actually incorrect) even if one or two (or in some cases even three) bits are flipped in the address portion of the data packet transmitted by the transmitter. This may occur even if the received signal strength (RSS) is relatively high. Some radio communication protocols such as Bluetooth® Low Energy (BLE) may have strict requirements for receivers being able to disregard data packets intended to be received by a different receiver.

One solution known in the art per se is to store the received samples of the whole sync word in a buffer and then pass the samples through the demodulator after the frequency offset and symbol timing have been found and corrected for. This relatively simple solution is not overly practical as it is very expensive to implement due to the number of large shift registers that are required in order to store the samples.

When viewed from a first aspect, the present invention provides a radio receiver device arranged to receive a radio signal including a data packet having an address portion and a payload portion, said radio receiver comprising:
 a first demodulation circuit portion arranged to demodulate the data packet and produce a first estimate of the address portion and a first estimate of the payload portion;
 a second demodulation circuit portion arranged to demodulate the data packet and produce a second estimate of the payload portion;
 a first comparison circuit portion arranged to compare said first and second estimates of the payload portion and produce a flag only if they are identical; and
 a second comparison circuit portion arranged, upon receipt of said flag, to compare said first estimate of the address portion to an expected address portion and to discard the data packet if they are not identical.

The first aspect of the invention extends to a method of operating a radio receiver device, said method comprising:
 receiving a radio signal including a data packet having an address portion and a payload portion;
 using a first demodulation circuit portion to demodulate the data packet and produce a first estimate of the address portion and a first estimate of the payload portion;
 using a second demodulation circuit portion to demodulate the data packet and produce a second estimate of the payload portion;
 comparing said first and second estimates of the payload portion and producing a flag only if they are identical; and
 upon receipt of said flag, comparing said first estimate of the address portion to an expected address portion and discarding the data packet if they are not identical.

The first aspect of the invention also extends to a radio communication system comprising a radio transmitter and a radio receiver device, wherein said radio receiver device comprises first and second demodulation circuit portions and first and second comparison circuit portions, said radio communication system being arranged such that:
 the radio transmitter device transmits to the radio receiver device a radio signal including a data packet having an address portion and a payload portion;
 the first demodulation circuit portion is arranged to demodulate the data packet and produce a first estimate of the address portion and a first estimate of the payload portion;
 the second demodulation circuit portion is arranged to demodulate the data packet and produce a second estimate of the payload portion;
 the first comparison circuit portion is arranged to compare said first and second estimates of the payload portion and produce a flag only if they are identical; and
 the second comparison circuit portion is arranged, upon receipt of said flag, to compare said first estimate of the address portion to an expected address portion and to discard the data packet if they are not identical.

The first aspect of the invention further extends to a non-transitory, computer-readable medium comprising instructions that, when executed on a suitable processor, cause the processor to operate a radio receiver device such that the radio receiver device:

receives a radio signal including a data packet having an address portion and a payload portion;

uses a first demodulation circuit portion to demodulate the data packet and produce a first estimate of the address portion and a first estimate of the payload portion;

uses a second demodulation circuit portion to demodulate the data packet and produce a second estimate of the payload portion;

compares said first and second estimates of the payload portion and produces a flag only if they are identical; and upon receipt of said flag, compares said first estimate of the address portion to an expected address portion and to discard the data packet if they are not identical.

Thus it will be appreciated by those skilled in the art that embodiments of the present invention provide a radio receiver that may use two different demodulators that are each arranged to receive the same data packet. The first demodulation circuit portion may, at least in preferred embodiments, comprise a low-performance demodulator while the second demodulation circuit portion may comprise a high-performance demodulator. It should be understood that the term "high-performance demodulator" as used herein refers to a demodulator that is more sensitive (and thus able to receive weaker signals) than the "low-performance demodulator". Typically such high performance modulators are more vulnerable to erroneously matching when there are a small number of flipped bits in the address portion than low-performance demodulators. Viewed another way, in some embodiments the sensitivity of the first modulator is lower than the sensitivity of the second modulator.

Embodiments of the invention may be able to receive packets which have a weaker signal strength than would be required for a low-performance demodulator whilst reducing the risk of erroneously accepting packets with flipped address bits by accepting only such packets with a signal strength between the sensitivities of the two modulators.

In a set of embodiments, the second demodulation circuit portion is at least 3 dB more sensitive than the first demodulation circuit portion.

The Applicant has appreciated that if the payload received by the high-performance demodulator matches the payload received by the low-performance demodulator, it can be reasonably assumed that the signal-to-noise ratio (SNR) is high and thus the address determined by the simple demodulator may be trusted to be accurate. If it is determined after comparing the expected address with the second estimate of the address produced by the second demodulator that there are a non-zero number of differences between them, it may be assumed that the soft-detection achieved by the correlator of the high-performance demodulator also contains a non-zero number of differences and it is determined that the data packet may be discarded as the data packet was most likely intended for a different recipient. Thus such a receiver that receives data packets having an address portion similar but not identical to the receiver's address may safely discard these packets rather than producing a false positive determination based on them being "similar enough" as would be the case with a conventional receiver.

Thus in some embodiments, the first demodulation circuit portion comprises a decision circuit portion arranged to provide the first estimate of the address portion, wherein the first estimate of the address portion is a hard estimate. As described previously, a "hard estimate" is achieved where a symbol-wise comparison of the received signal and a known sequence is carried out in order to provide a definitive or "hard" decision of whether or not the two match.

In a set of potentially overlapping embodiments, the second demodulation circuit portion comprises a correlator arranged to provide a second estimate of the address portion, wherein the second estimate of the address portion is a soft estimate. In contrast to a hard estimate as outlined hereinabove, a "soft estimate" provides a "fuzzy" output that indicates how certain it is of a particular match without committing to a definitive decision. Thus if the second estimate of the address portion differs from the known sequence by a small number of bits, the correlator may provide a false positive decision depending on a certainty criterion of the correlator. While the correlator may produce an estimate of the entire address portion of the data packet, in some embodiments the second estimate of the address portion comprises an estimate of a subset of the address portion. The correlator may, by way of non-limiting example only, look for half the address (e.g. the first 16 bits of a 32-bit address). The remaining half of the address may then be synchronised or "bit-synced" after all of the bits have passed through the second demodulation circuit portion. This may advantageously enable the two demodulation circuit portions to be bit-synced with each other if, for some reason, it cannot be safely assumed that there is a fixed timing relationship therebetween.

As discussed previously, the radio receiver device is arranged to compare the first estimate of the address portion to an expected address portion if it is determined that the estimates of the payload portion produced by each of the demodulation circuit portions are equal. In some embodiments, the radio receiver is arranged to accept the data packet if the first and second estimates of the payload portions are not identical. In such embodiments, the receiver assumes that a received signal strength of the radio signal is below a sensitivity threshold of the first demodulation circuit portion but above a sensitivity threshold of the second demodulation circuit portion. As such, the receiver may determine that only the second demodulation circuit portion may be trusted and use the second estimate of the address portion instead of the first estimate of the address portion.

In a set of embodiments, the first and second estimates of the payload are hard estimates.

In a set of embodiments the expected address portion corresponds to an address assigned to the radio receiver. However this is not essential. For example the receiver could be acting as a proxy, relay or bridge for another device to which the address is assigned.

The Applicant has further appreciated that if for some reason the high-performance demodulator cannot demodulate the packet successfully but the simple demodulator can, it is possible to use the output from the simple receiver in order to avoid losing the packet altogether. Thus in some embodiments, the receiver further comprises an output portion that produces a determined payload portion, wherein: the determined payload portion comprises the second estimate of the payload portion if it has been determined that the first demodulation circuit has not demodulated the packets successfully; and the determined payload portion comprises the first estimate of the payload portion otherwise.

It may be seen from the above that embodiments of the invention use a comparison between two demodulators to determine which of their outputs should be used. When viewed from a second aspect, the present invention provides a radio receiver device arranged to receive a radio signal including a data packet, said radio receiver device comprising a first demodulation circuit portion and a second demodulation circuit portion, said radio receiver device being arranged to compare a first output of the first demodulation circuit portion to a second output of the second demodulation circuit portion and to use said comparison to determine to what extent to use said first and second outputs.

The second aspect of the invention extends to a method of operating a radio receiver device comprising a first demodulation circuit portion and a second demodulation circuit portion, said method comprising: receiving a radio signal including a data packet; comparing a first output of the first demodulation circuit portion to a second output of the second demodulation circuit portion; and using said comparison to determine to what extent to use said first and second outputs.

In some embodiments, the radio receiver device further comprises a multiplexer arranged to switch between which of the first and second outputs is written to memory (e.g. to random access memory). If only the high-performance demodulator gets a successful address match, e.g. because the received signal strength of the incoming radio signal is sufficient for the high-performance demodulator but insufficient for the low-performance demodulator, the multiplexer may switch to the output of the high-performance demodulator. If on the other hand the address comprises a particular bit sequence that the high-performance demodulator is less able to decode but that can be handled by the low-performance demodulator, only the low-performance demodulator may achieve a successful address match and so the multiplexer may switch to the output of the low-performance demodulator. If both demodulators achieve a successful address match, the multiplexer may select the high-performance demodulator by default as this is the more sensitive of the two demodulators and theoretically should have the more reliable output. The radio receiver device may subsequently use the payload portion comparison described hereinabove to determine whether to accept the packet. The comparator for the two payloads may comprise an exclusive-OR or "XOR" operation performed on the 'live' data as it is received, removing the need to store the output produced by the low-performance demodulator.

The outputs of both demodulation circuit portions could be saved to memory and a checksum or "cyclic redundancy check" (CRC) associated with each of said outputs verified in order to determine which, if any, demodulation circuit portion to use. However, in the embodiments described above which employ a multiplexer and determine which of the demodulation circuit portions' respective outputs should be stored in memory may provide the advantages of having demodulation circuit portions while only needing to retain the output of one of them.

Certain embodiments of the invention will now be described, by way of example only, with reference to the accompanying drawings in which.

Figure 1:
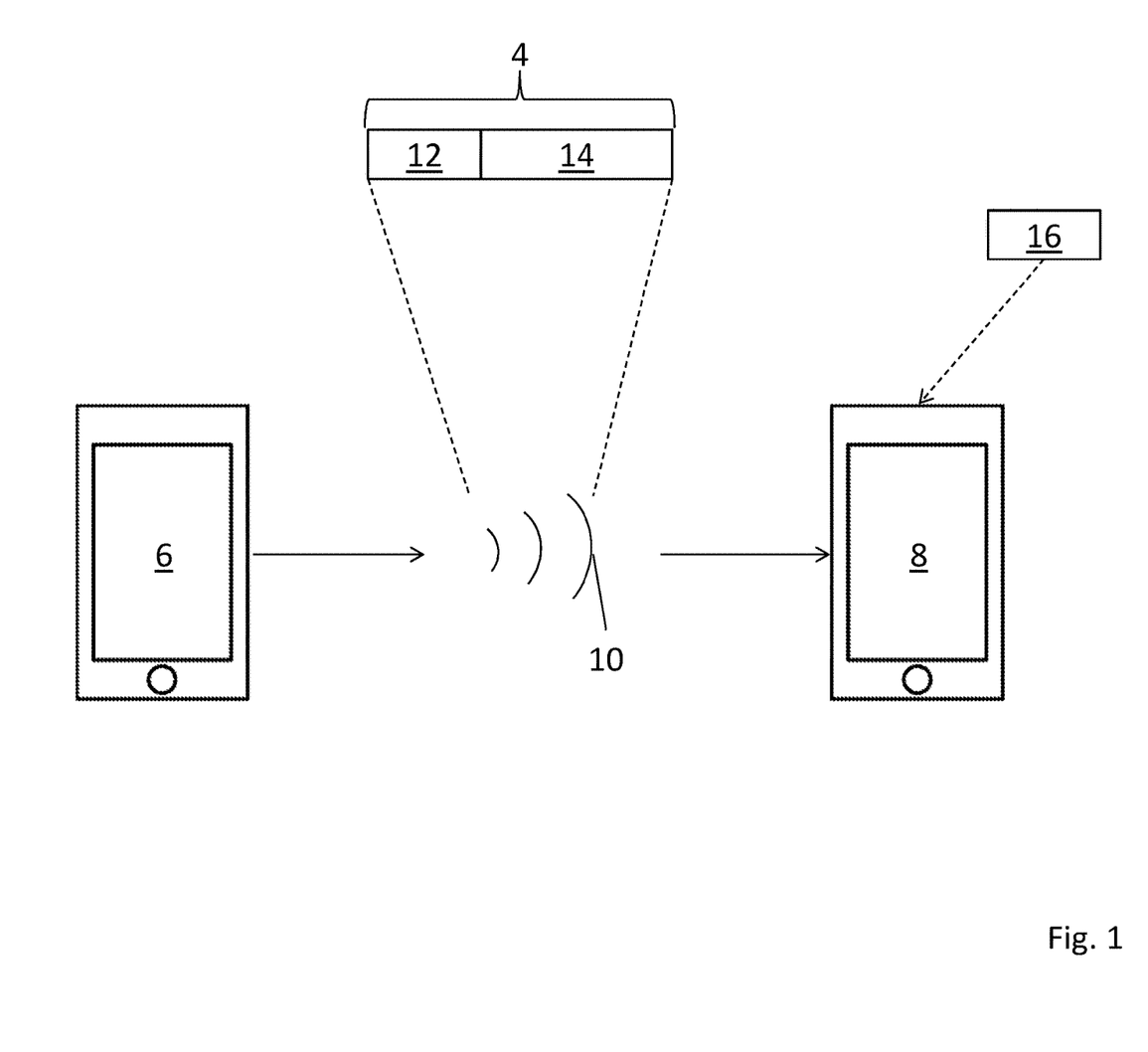
FIG. 1 shows an exemplary radio communications system wherein a data packet is conveyed from one device to another via a radio signal.

FIG. 1 shows an exemplary radio communications system 2 comprising a first electronic device 6 arranged to send a data packet 4 to a second electronic device 8 via a radio signal 10. The two devices 6, 8 are arranged to communicate with each other using a radio frequency communications protocol known in the art per se such as Bluetooth® Low Energy. The data packet 4 is modulated onto the radio signal 10 by a transmitter (not shown) within the first electronic device 6. The data packet 4 comprises an address portion 12 and a payload portion 14, wherein the address portion 12 contains data that identifies an intended recipient of the data packet 4 while the payload 14 contains data (e.g. a message, audio data, video data, etc.). Each device 6, 8 has an associated address and is arranged to check whether the address portion 12 of the data packet 4 matches its own address following demodulation of the received radio signal 10. In this case, the second device 8 is arranged to check whether its address 16 matches the address portion 12 of the data packet 4 following the demodulation procedure described below with reference to FIGS. 2 to 4.

Figure 2:
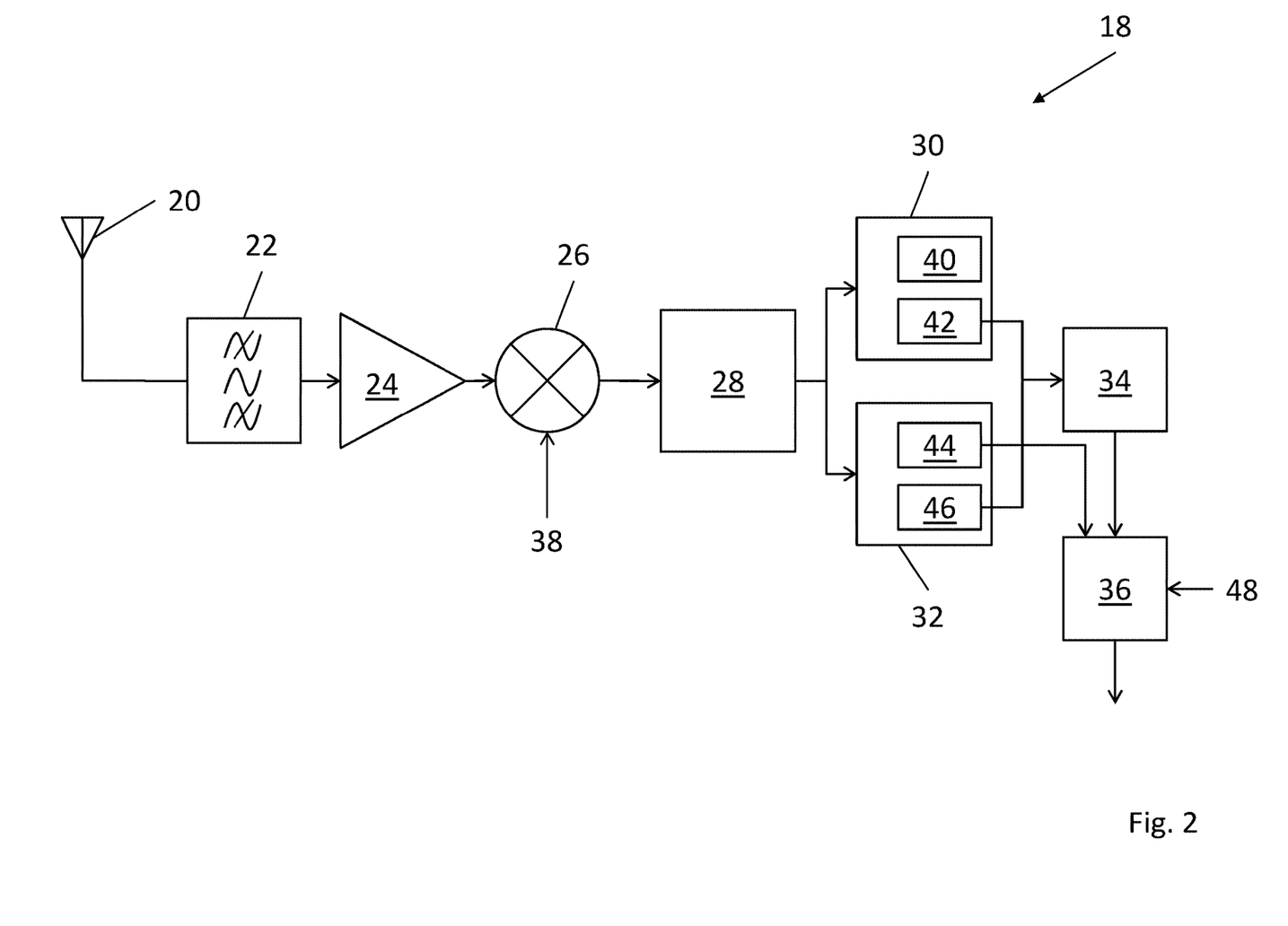
FIG. 2 is a block diagram of a radio receiver device in accordance with an embodiment of the present invention.

FIG. 2 is a block diagram of a radio receiver device 18 in accordance with an embodiment of the present invention. This radio receiver device 18 may, by way of non-limiting example only, be used in the electronic device 8 described previously with reference to FIG. 1. It will of course be appreciated that this is merely an example and that the radio receiver device 18 described below may be used in a wide variety of different radio communication systems.

The radio receiver device 18 comprises: an antenna 20; a bandpass filter 22; an amplifier 24; a mixer 26; a sample-and-hold digital signal processor (DSP) 28; a high-performance demodulator 30; a low-performance demodulator 32; a payload comparator 34; and an address comparator 36. The high-performance demodulator 30 may have, for example, a sensitivity that is 3 dB higher than that of the a low-performance demodulator 32.

The radio signal 10 transmitted by the first device 6 is received by the antenna 20 in the second device 8. The antenna 20 converts the electromagnetic signal it receives to an electrical signal. This electrical signal is passed through the bandpass filter 22 which removes frequency components that are not within a desired frequency spectrum. The resulting filtered signal is amplified by the amplifier 24 which provides an amplified, filtered signal to an input of the mixer 26. This mixer 26 also receives a local oscillator signal 38 such that the mixer 26 down-mixes the signal from the amplifier 24 to baseband or to an intermediate frequency.

The resulting down-mixed signal is input to the sample-and-hold processor 28 which converts the analogue down-mixed signal to a digital signal comprising a number of quantised samples. The resultant digital signal is input to the high-performance demodulator 30 and the low-performance modulator 32. Each of these demodulators 30, 32 is arranged to produce an estimate of the address portion 12 and the payload portion 14 of the data packet 4. However, the manner in which each demodulator 30, 32 acquires these estimates differs from one to another as will be described below.

The high-performance demodulator 30 is arranged to produce an estimate 40 of the address portion 12 and an estimate 42 of the payload portion 14. The acquisition of the estimate 42 of the payload portion 14 is achieved by "hard-matching" the appropriate samples from the sample-and-hold processor 28 and deciding which symbol e.g. a digital '0' or '1' the samples correspond to. However, the high-performance demodulator 30 uses "soft-matching" to produce the estimate 40 of the address portion 12. This soft-matching is achieved by imputing the samples from the sample-and-hold processor 28 into a correlator (not shown) which uses a "sliding window" based comparison (e.g. using a matched filter bank) to produce an output indicative of how confident the estimate 40 of the address portion 12 produced by the high-performance demodulator 30 is.

By way of contrast, the estimate 44 of the address portion 12 and the estimate 46 of the payload portion 14 produced by the low-performance demodulator 32 are both acquired using hard-matching as described previously. The low-performance demodulator 32 is simpler than the high-performance demodulator 30, and as such is less sensitive and thus unable to process signals with weak received signal strength as the high-performance demodulator 30 can. However, due to its simpler construction and the use of hard-matching, the low-performance demodulator 32 is less susceptible to errors caused by a small number of flipped bits in the address portion 12 than the high-performance demodulator 30, whose correlator may produce false positive results if only one or two bits within the address portion 12 have been flipped (i.e. an intended digital '1' is received as a digital '0' or vice versa).

The estimate 42 of the payload portion 14 produced by the high-performance demodulator 30 and the estimate 46 of the payload portion 14 produced by the low-performance demodulator 32 are input to a payload comparator 34. The payload comparator 34 is arranged to compare the two estimates 42, 46 of the payload portion 14 and determine whether or not they are identical. If they are identical, the address comparator 36 compares the estimate 44 of the address portion 14 provided by the low-performance demodulator 32 to an expected address 48.

Figure 3A:
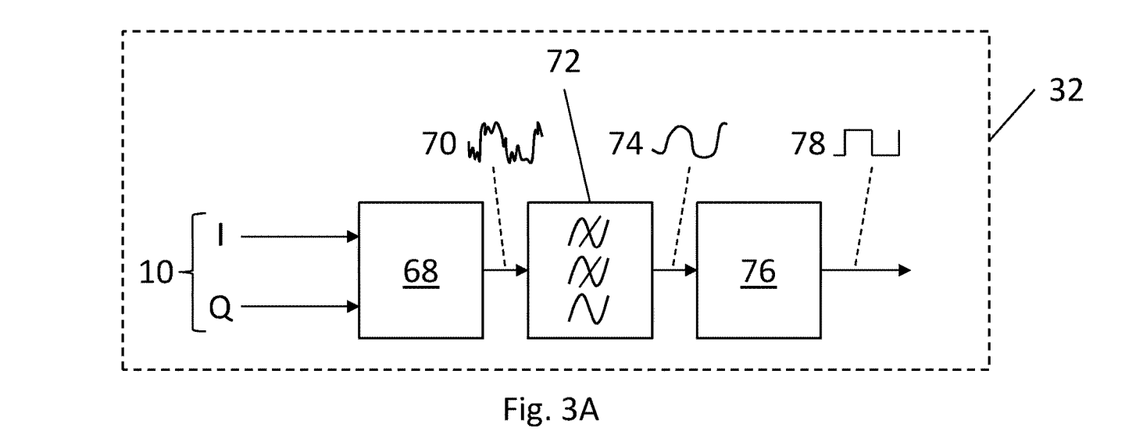
FIGS. 3A and 3B are block diagrams of low-performance and high-performance demodulators suitable for use in the radio receiver of FIG. 2 respectively.
Figure 3B:
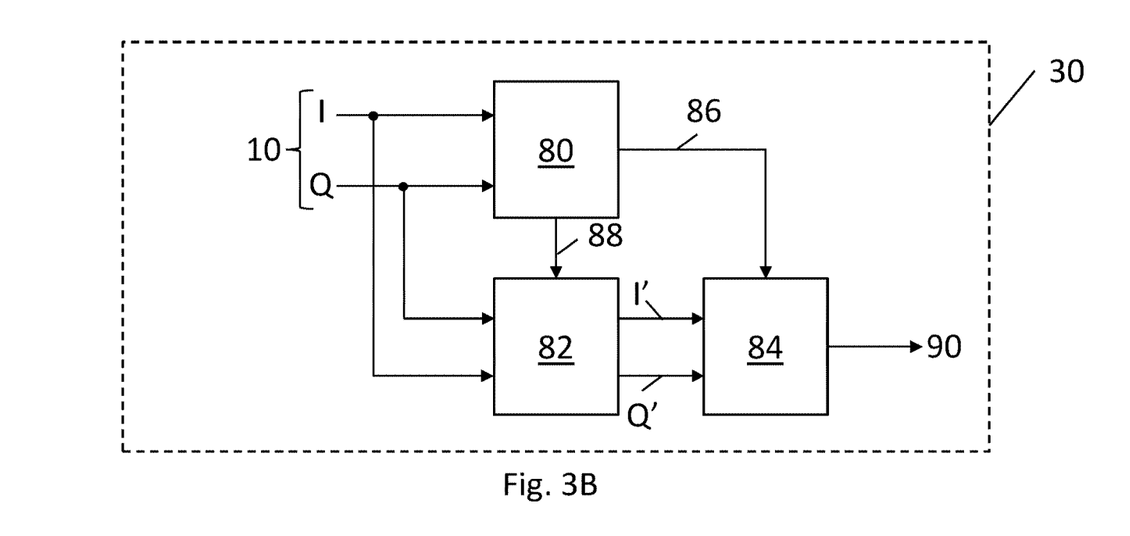

FIGS. 3A and 3B are block diagrams of the low-performance demodulator 32 and the high-performance demodulator 30 suitable for use in the radio receiver device 18 of FIG. 2 respectively.

The low-performance demodulator 32 shown in FIG. 3A comprises: a frequency modulation (FM) demodulator 68; a low-pass filter 72; and a "bit slicer" 76. In-phase (I) and quadrature (Q) components of the radio signal 10 are input to the FM demodulator 68 which provides a demodulated signal 70. This demodulated signal 70 is input to the low-pass filter 72 which removes any unwanted high frequency components (e.g. noise), so as to produce a filtered signal 74. The filtered signal 74 is input to the bit slicer 76 which applies a threshold to the filtered signal 74 in order to produce a digital output signal 78.

The high-performance demodulator 30 shown in FIG. 3B comprises: a synchronisation correlator 80; a frequency offset compensator 82; and a matched filter bank (MFB) 84. In-phase (I) and quadrature (Q) components of the radio signal 10 are input to the synchronisation correlator 80 and the frequency offset compensator 82. The synchronisation correlator 80 is arranged to correlate the I and Q signals with a known sequence in order to determine when a packet 2 has been detected and produce a detection signal 86, which provides symbol timing information, and a frequency offset signal 88, wherein the frequency offset signal 88 is an estimate of any offset between the nominal frequency of the I and Q signals (i.e. the frequency of the radio signal 10) and the expected frequency of the radio signal 10.

The frequency offset signal 88 produced by the synchronisation correlator 80 is input to the frequency offset compensator 82 which adjusts for the frequency offset and produces compensated in-phase (I') and quadrature (Q') signals which are input to the MFB 84, which also receives the symbol timing information (i.e. the detection signal 86) from the synchronisation correlator 80. The MFB 84 comprises a "bank" of all possible bit sequences, which it compares the incoming I' and Q' signals to in order to determine a "confidence level" for each potential match. The MFB 84 produces an output signal 90 which may, in some arrangements, be a "soft" output, that indicates a confidence level for each bit (e.g. a value between 0 and 1, wherein the closer a given value is to 0 indicates stronger confidence that the corresponding bit is a digital '0' whereas the closer a given value is to 1 indicates stronger confidence that the corresponding bit is a digital '1'. however, it will be appreciated that, in some arrangements, a final "hard" decision may be made for each bit, e.g. by applying a threshold or by inputting the signal 90 to a Viterbi decoder.

The operation of the radio receiver device 18 shown in FIG. 2 will now be described with reference to FIG. 4.

Figure 4:
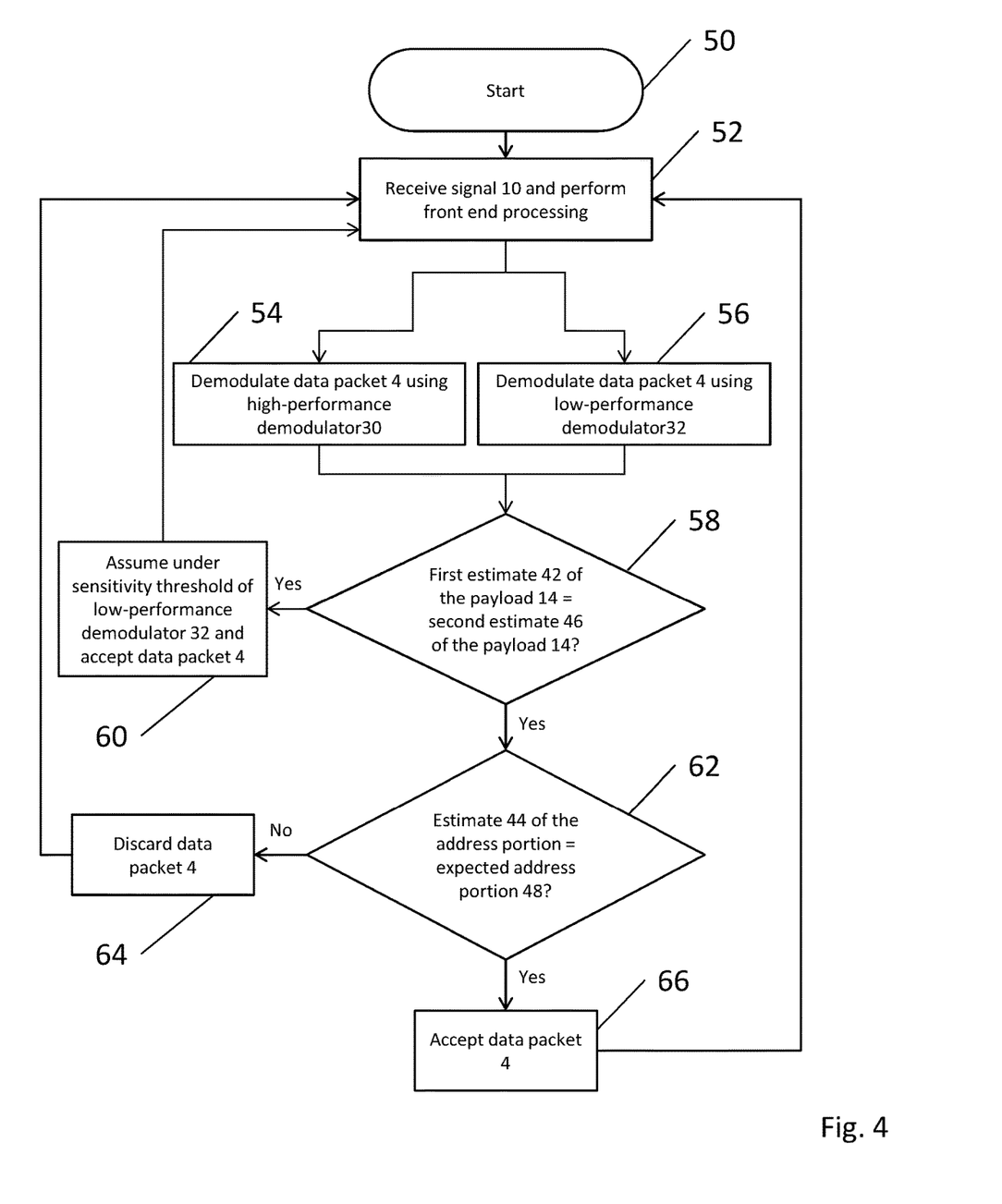
FIG. 4 is a flow chart of the demodulation process used by the radio receiver of FIG. 2.

FIG. 4 is a flowchart of the demodulation process used by the radio receiver 18 of FIG. 2. Once initialised at step 50, the radio receiver 18 receives the radio signal 10 via the antenna 20 and performs front end processing at step 52 using the filter 22, the amplifier 24, the mixer 26, and the sample-and-hold processor 28 described previously.

At step 54 the high-performance demodulator 30 demodulates the radio signal 10 in order to recover the data packet 4 and produces the estimate 40 of the address portion 12 and the estimate 42 of the payload portion 14.

At step 56 the low-performance demodulator 32 produces the estimate 44 of the address portion 12 and the estimate 46 of the payload portion 14, wherein both estimates 44, 46 are hard estimates. As can be seen from FIG. 3, steps 54 and 56 take place simultaneously, i.e. both demodulators 30, 32 act simultaneously and in parallel with one another.

At step 58, the payload comparator 34 compares the estimates 42, 46 of the payload portion 14 to determine whether they are equal. If they are not equal, at step 60 it is assumed that the radio signal 10 received by the antenna 20 is below the sensitivity threshold of the low-performance demodulator 32 and so the data packet 4 is accepted and the estimates 40 and 42 of the address portion 12 and payload 14 respectively are used thereafter.

If on the other hand the estimates 42, 46 of the payload portion 14 produced by the high-performance demodulator 30 and the low-performance demodulator 32 are identical, the radio receiver device 18 assumes that the estimate 44 of the address portion 12 produced by the low-performance demodulator 32 can be trusted.

Assuming that the estimates 42, 46 of the payload portion 14 are identical, at step 62 the address comparator 36 compares the now-trusted estimate 44 of the address portion 12 produced by the low-performance demodulator 32 to an expected address portion 48. This expected address portion 48 is typically the address portion 16 assigned to the receiving device 8, however it will be appreciated that the radio receiver device 18 may be arranged to listen for data packets 4 intended for another device, e.g. if the receiving device 8 is acting as a bridge or a proxy.

If the address comparator 36 determines that the estimate 44 of the address portion 12 produced by the low-performance demodulator 32 does not match the expected address 48, at step 64 the data packet 4 is discarded as it may be assumed that the data packet 4 was intended for a different recipient. However, if the estimate 44 of the address portion 12 produced by the low-performance demodulator 32 does match the expected address 48, the data packet is accepted at step 66.

Regardless of whether the data packet 4 is accepted at step 60 or step 66, or is discarded at step 64, the radio receiver device 18 returns to step 52 in order to receive the next incoming signal.

Figure 5:
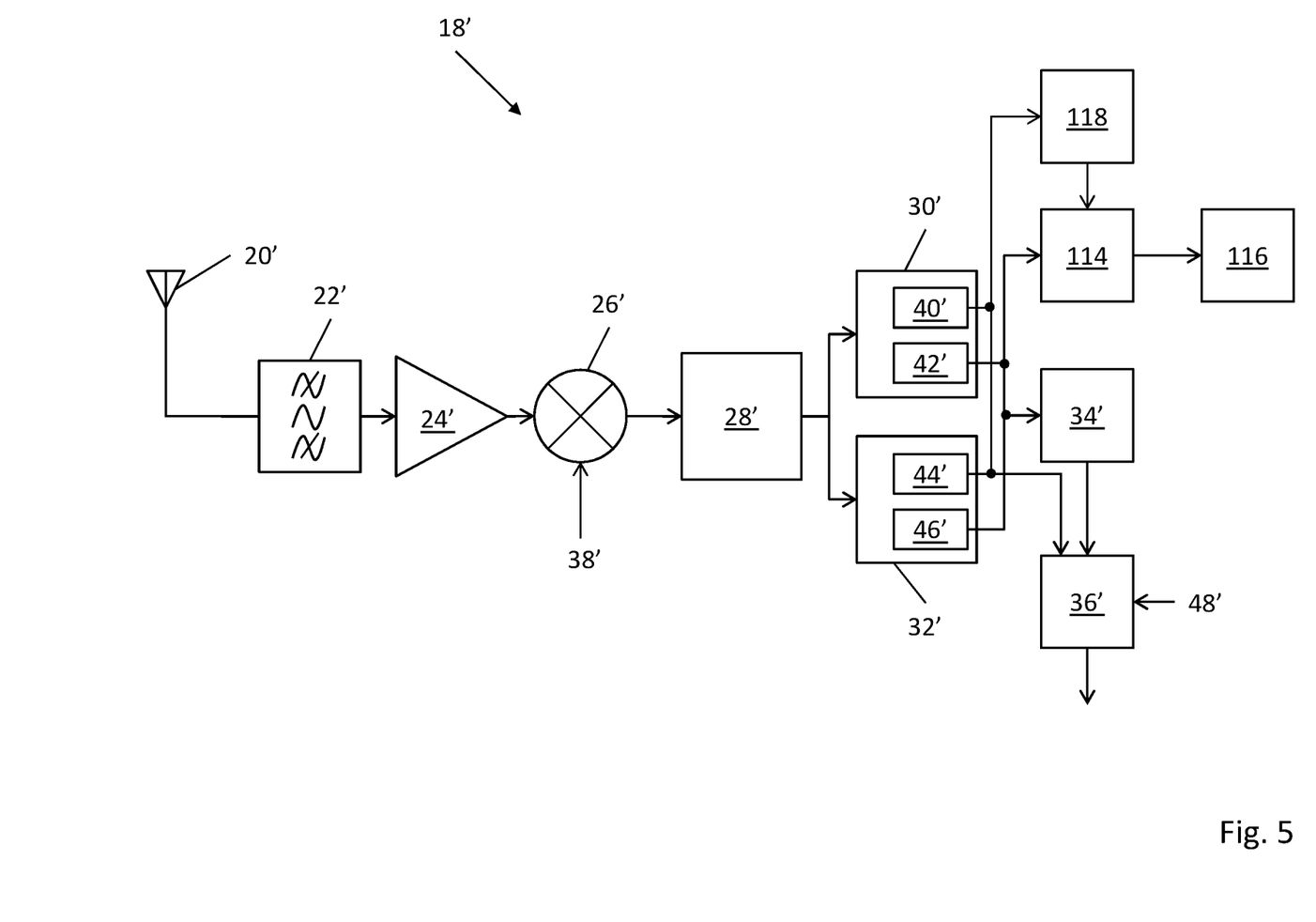
FIG. 5 is a block diagram of a radio receiver device in accordance with a further embodiment of the present invention.

FIG. 5 is a block diagram of a radio receiver device in accordance with a further embodiment of the present invention. It should be noted that, when compared with the radio receiver device 18 described previously with reference to FIG. 3, like reference numerals denote like components. In this embodiment, the radio receiver device 18' further comprises a multiplexer (MUX) 114 arranged to switch between which of the first and second payload outputs 42', 46' is written to a random access memory 116. The MUX 114 is controlled by an determination section 118, the operation of which is described below with reference to the flow char of FIG. 6.

Figure 6:
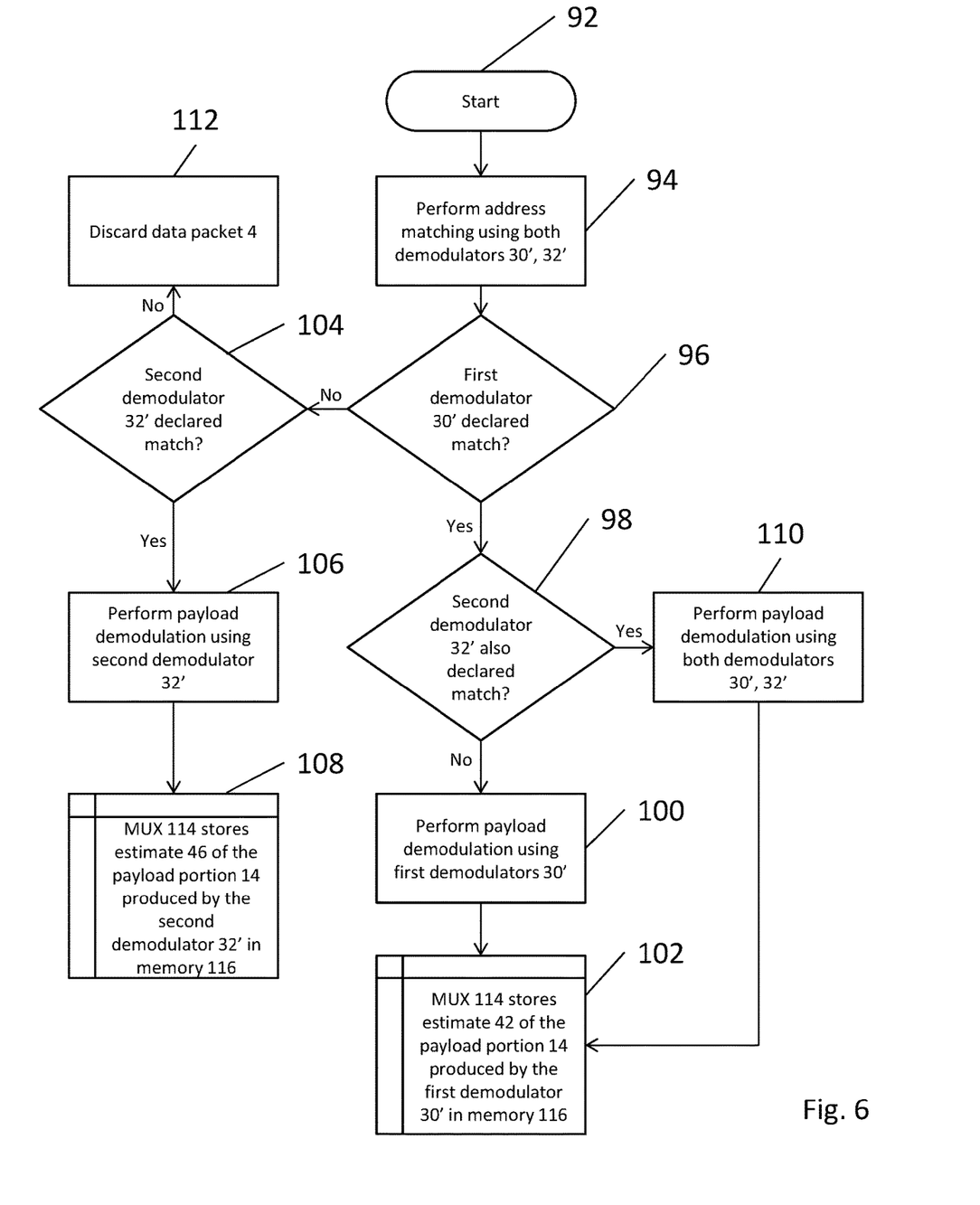
FIG. 6 is a flow chart of the determination of which demodulator's payload output should be stored during operation of the receiver device of FIG. 5.

FIG. 6 is a flow chart of the operation of the determination unit 118 which controls the MUX 114 so as to arbitrate which of the two demodulator's 30', 32' payload output 42', 46' should be stored during operation of the receiver device 18' of FIG. 5. Once initialised at step 92, the radio receiver 18' performs address matching using both demodulators 30', 32' to provide estimates 40', 44' of the address portion 14 at step 94.

If at step 96 the first demodulator 30' declares an address match but at step 98 the second demodulator 32' does not, e.g. because the received signal strength of the incoming radio signal 10 is sufficient for the first, high-performance demodulator 30' but insufficient for the second, low-performance demodulator 32', payload demodulation will only be carried out using the first demodulator 30' at step 100 and the MUX 114 routes the payload estimate 42' produced by the first demodulator 30' to memory 116.

If, on the other hand, at step 96 the first demodulator 30' does not declare an address match but at step 104 the second demodulator 32' does, e.g. because the address portion 14 comprises a particular bit sequence that the first, high-performance demodulator 30' is not able to decode but that can be handled by the second, low-performance demodulator 32', payload demodulation will only be carried out using the second demodulator 32' at step 106 and the MUX 114 routes the payload estimate 46' produced by the second demodulator 32' to memory 116.

If both demodulators 30', 32' achieve successful address matches at steps 96 and 98, they carry out payload portion comparison as described previously with reference to FIGS. 3 and 4 using an exclusive-OR operation performed on the 'live' data as it is demodulated. The MUX 114 routes the payload estimate 42' produced by the first, high-performance demodulator 30' to memory 116 by default as this is the more sensitive of the two demodulators 30', 32' and theoretically should have the more reliable output. There is therefore no need to store the output produced by the second, low-performance demodulator 32' at all. The comparison of the two payload estimates produced by the two demodulators 30', 32' is used to decide whether to accept or reject the packet stored in the memory 116 as previously described.

Thus it will be seen that embodiments of the present invention provide an improved radio receiver device that uses a high-performance demodulator to verify the accuracy of a low-performance demodulator and, if it is deemed trustworthy, to use an estimate of the address portion of a received data packet produced by the low-performance demodulator when deciding whether to accept or discard the packet. This allows the receiver to receive signals with a signal strength up to 3 dB lower than if the low-performance demodulator were used by itself without significantly increasing the risk of mistakenly accepting packets with a few flipped bits in the address portion.

It will be appreciated by those skilled in the art that the embodiments described above are merely exemplary and are not limiting on the scope of the invention.

The invention claimed is:

1. A radio receiver device arranged to receive a radio signal including a data packet having an address portion and a payload portion, said radio receiver comprising:
 a first demodulation circuit portion arranged to demodulate the data packet and produce a first estimate of the address portion and a first estimate of the payload portion;
 a second demodulation circuit portion arranged to demodulate the data packet and produce a second estimate of the payload portion;
 a first comparison circuit portion arranged to compare said first and second estimates of the payload portion and produce a flag only if they are identical; and
 a second comparison circuit portion arranged, upon receipt of said flag, to compare said first estimate of the address portion to an expected address portion and to discard the data packet if they are not identical.

2. The radio receiver device as claimed in claim 1, wherein the first demodulation circuit portion comprises a low-performance demodulator and the second demodulation circuit portion comprises a high-performance demodulator.

3. The radio receiver device as claimed in claim 1, wherein the second demodulation circuit portion is at least 3 dB more sensitive than the first demodulation circuit portion.

4. The radio receiver device as claimed in claim 1, wherein the first demodulation circuit portion comprises a decision circuit portion arranged to provide the first estimate of the address portion, wherein the first estimate of the address portion is a hard estimate.

5. The radio receiver device as claimed in claim 1, wherein the second demodulation circuit portion comprises a correlator arranged to provide a second estimate of the address portion, wherein the second estimate of the address portion is a soft estimate.

6. The radio receiver device as claimed in claim 5, wherein the second estimate of the address portion comprises an estimate of a subset of the address portion.

7. The radio receiver device as claimed in claim 1, wherein the radio receiver is arranged to accept the data packet if the first and second estimates of the payload portions are not identical.

8. The radio receiver device as claimed in claim 7, arranged to use the second estimate of the address portion instead of the first estimate of the address portion.

9. The radio receiver device as claimed in claim 1, wherein the first and second estimates of the payload are hard estimates.

10. The radio receiver device as claimed in claim 1, wherein the expected address portion corresponds to an address assigned to the radio receiver.

11. The radio receiver device as claimed in claim 1, further comprising an output portion that produces a determined payload portion, wherein: the determined payload portion comprises the second estimate of the payload portion if it has been determined that the first demodulation circuit has not demodulated the packets successfully; and the determined payload portion comprises the first estimate of the payload portion otherwise.

12. The radio receiver device as claimed in claim 11 further comprising a multiplexer arranged to switch between which of the first and second outputs is written to memory.

13. The radio receiver device as claimed in claim 11 arranged to save both first and second outputs to memory and to verify a checksum or cyclic redundancy check associated with each of said outputs in order to determine which, if any, demodulation circuit portion to use.

14. The radio receiver device as claimed in claim 1, comprising a first output from the first demodulation circuit portion and a second output from the second demodulation circuit portion.

15. A method of operating a radio receiver device, said method comprising: receiving a radio signal including a data packet having an address portion and a payload portion;
  using a first demodulation circuit portion to demodulate the data packet and produce a first estimate of the address portion and a first estimate of the payload portion;
  using a second demodulation circuit portion to demodulate the data packet and produce a second estimate of the payload portion;
  comparing said first and second estimates of the payload portion and producing a flag only if they are identical; and
  upon receipt of said flag, comparing said first estimate of the address portion to an expected address portion and discarding the data packet if they are not identical.

16. A radio communication system comprising a radio transmitter and a radio receiver device, wherein said radio receiver device comprises first and second demodulation circuit portions and first and second comparison circuit portions, said radio communication system being arranged such that:
  the radio transmitter device transmits to the radio receiver device a radio signal including a data packet having an address portion and a payload portion;
  the first demodulation circuit portion is arranged to demodulate the data packet and produce a first estimate of the address portion and a first estimate of the payload portion;
  the second demodulation circuit portion is arranged to demodulate the data packet and produce a second estimate of the payload portion;
  the first comparison circuit portion is arranged to compare said first and second estimates of the payload portion and produce a flag only if they are identical; and
  the second comparison circuit portion is arranged, upon receipt of said flag, to compare said first estimate of the address portion to an expected address portion and to discard the data packet if they are not identical.

17. A non-transitory, computer-readable medium comprising instructions that, when executed on a suitable processor, cause the processor to operate a radio receiver device such that the radio receiver device:
  receives a radio signal including a data packet having an address portion and a payload portion;
  uses a first demodulation circuit portion to demodulate the data packet and produce a first estimate of the address portion and a first estimate of the payload portion;
  uses a second demodulation circuit portion to demodulate the data packet and produce a second estimate of the payload portion;
  compares said first and second estimates of the payload portion and produces a flag only if they are identical; and
  upon receipt of said flag, compares said first estimate of the address portion to an expected address portion and to discard the data packet if they are not identical.

* * * * *